United States Patent [19]
Machida et al.

[11] Patent Number: 5,523,575
[45] Date of Patent: Jun. 4, 1996

[54] IMAGE IDENTIFYING APPARATUS USING AN IMAGE SENSOR TO EXTRACT FALSE IMAGE DATA FROM A DOCUMENT IMAGE AND DISCRIMINATE THE IMAGE BY COMPARING THE FALSE IMAGE DATA TO A PREDETERMINED PATTERN

[75] Inventors: Haruhiko Machida; Yoshimi Koishi, both of Tokyo, Japan

[73] Assignee: Daichu Denshi Co., Ltd., Tokyo, Japan

[21] Appl. No.: 330,008

[22] Filed: Oct. 27, 1994

[30] Foreign Application Priority Data

Dec. 2, 1993 [JP] Japan .................... 5-338847

[51] Int. Cl.⁶ .................................................. H01J 40/14
[52] U.S. Cl. ................. 250/208.1; 250/556; 250/214 A; 330/281
[58] Field of Search ................. 250/208.1, 556, 250/566, 569, 214 A, 214 AG; 235/462, 472; 209/534; 356/71; 902/4, 5, 7, 40; 330/59, 308, 280, 281

[56] References Cited

U.S. PATENT DOCUMENTS

4,908,516  3/1990  West ............................. 250/556
5,247,166  9/1993  Cannon et al. ..................... 250/208.1

Primary Examiner—Edward P. Westin
Assistant Examiner—Que T. Le
Attorney, Agent, or Firm—Sughrue, Mion, Zinn, Macpeak & Seas

[57] ABSTRACT

The image sensor according to the present invention comprises a light emitting diode which irradiates light onto a document image, a phototransistor which receives the reflected light and executes photoelectric conversion, an amplifier which amplifies an analog signal from the phototransistor, a time constant circuit into which an analog signal from the amplifier is inputted and which delays the analog signal by a specified period of time, an amplifier into which the analog signal outputted from the amplifier and the analog signal delayed in the time constant circuit are inputted and which differentially amplifies the analog signals, and a knot gate into which the analog signals outputted from the amplifier are inputted and which outputs a digital signal of "0" or "1" according to whether a value for the analog signal is positive or negative.

8 Claims, 10 Drawing Sheets

DIRECTION TO BE TRANSFERRED

IMAGE INPUT POSITION

IMAGE IDENTIFYING APPARATUS USING AN IMAGE SENSOR TO EXTRACT FALSE IMAGE DATA FROM A DOCUMENT IMAGE AND DISCRIMINATE THE IMAGE BY COMPARING THE FALSE IMAGE DATA TO A PREDETERMINED PATTERN

FIELD OF THE INVENTION

The present invention relates to an image sensor used in an apparatus for discriminating a document image, and more particularly to an image sensor which reads a document image as false image data as well as to an image identifying apparatus using the same.

BACKGROUND OF THE INVENTION

In recent years, in association with the progress in the fields of image processing technology or various types of device technology as well as with automation in commerce, industry, and other industrial fields, an image identifying technology for identifying whether a document image is a particular image or not has been widely utilized.

Examples of a conventional type of image identifying apparatus include, for instance, ATM (Automatic teller Machine) used in banks or other financial institutions, a bar code reader used in a process of checking printed picture in a production line of a printing factory, an apparatus for assorting merchandise coupons, and a mark reader used in various types of assortment work.

In this type of image identifying apparatus as described above, discrimination (identification) as to whether an document image is a particular image or not is executed by irradiating light to a document image, receiving the reflected light with an image sensor in which a CCD element is used, generating an analog signal by executing photoelectric conversion, amplifying the analog signal to a specified range with an amplifier, then converting the analog signal to a 2-valued digital signal using a threshold value preset by an A/D convertor, reading image data of the document image, and then comparing the image data to a preset pattern (digital signal) for discrimination. In other words, density data (image data) is generated by optically reading a document image and discrimination of the document image is mad based on this density data.

However, with the image identifying apparatus using a CCD element as a conventional type of image sensor therein, it is possible to carry out a high performance image identification by reading an image at a high precision with a CCD element, but as the CCD element is expensive, price of the apparatus also becomes expensive, and the technology as described above is not suited to realization of a cheap system.

Also some users sometimes hope to carry out image identification at a certain degree of accuracy with a cheap system which is not so high in its performance, but any image sensor that can satisfy the demands as described above in a scope of practical applications is not available. Especially in relation to the needs for image identification in a state where types of document image are limited, development of an image sensor which enables image identification in low cost at a high speed has been desired.

On the other hand, a reflection type of sensor with an amplifier is available as an image sensor, and this type of sensor is cheaper as compared to that using a CCD elements therein, but as an input analog signal is converted to a digital signal based on whether said input analog signal is larger than a threshold value (threshold level) or not, it is necessary to execute at a high precision gain adjustment for amplifying an analog signal to a specified range in order to precisely read a document image, and the gain adjustment is very complicated, which is disadvantageously in practical operation. For this reason, this type of technology is suited for checking simply whether an identical object or an identical marking exists or not, but it is not suited to a sensor to discriminate a detailed pattern with a certain degree of accuracy.

Also in the conventional type of reflection type sensor with an amplifier as described above, reflected light is focused via a lens to a photoelectric conversion element such as a phototransistor and also to provide a certain space corresponding to the focus range between the lens and the photoelectric conversion element, which makes it difficult to make a sensor compact.

Also when, for instance, a quantity of light from a light source to irradiate light onto a document image changes due to elapse of time, an analog signal outputted from the photoelectric conversion element becomes generally smaller, so that a circuit to maintain a quantity of light from the light source is required to read an document image at a high precision and for this reason it is difficult to make a sensor.

SUMMARY OF THE INVENTION

It is a first object of the present invention to provide a compact image sensor which is low in cost and allows easy gain adjustment.

Also the present invention was made in the light of circumstances as described above, and it is a second object of the invention to provide an image sensor as well as an image identifying apparatus which enables image identification with low cost and at a high precision when it is desired to execute image identification on the condition that types of document image are limited to a certain number.

In order to achieve the first object, the present invention provides an image sensor comprising a light emitting diode which irradiates light onto a document image, a phototransistor which receives reflected light from the document image and executes photoelectric conversion, an operational amplifier which amplifies an analog signal from the phototransistor, a time constant circuit which receives an analog signal outputted from the operational amplifier, a differential amplifier into which an analog signal outputted from the operational amplifier and an analog signal delayed by the time constant circuit are supplied as input and which executes differential amplification, and an analog signal conversion element into which the analog signal outputted from the differential amplifier is supplied as input and outputs a digital signal of "0" or "1" according to a positive or negative value of the analog signal respectively.

It should be noted that the analog signal conversion element is a knot gate.

Also in order to achieve the second object as described above, the present invention provides an image identifying apparatus which makes discrimination as to whether a document image is a particular one or not by comparing image data generated by optically reading an document image to a preset pattern for discrimination, comprising a plurality of image sensors each differential amplifying an analog signal generated by irradiating light onto an document image, receiving the reflected light, and executing photoelectric conversion for the analog signal as well as an analog signal obtained by delaying the analog signal above and outputting a digital signal of "0" or "1" as false image data according to a positive or negative value of the analog signal differentially amplified as described above, a storage means in which a 2-valued digital signal for discriminating a particular image specified previously has been stored, a discriminating means for making a discrimination as to whether a document image is a particular image or not by comparing false image data supplied as input from the plurality of image sensors described above to the pattern for discrimination stored in the storage means, wherein the plurality of image sensors are provided in correspondence to positions of characteristic portions of the document image and each of the image sensors inputs an image of the characteristic portion of the document image respectively.

The image sensor according to the present invention receives reflected light of the light irradiated from a light emitting diode with a phototransistor, executes photoelectric conversion, amplifies an analog signal from the phototransistor in the operational amplifier, delays the analog signal amplified in the time constant circuit by a specified time, then differential amplifies the analog signal outputted from the operational amplifier as well as the delayed analog signal in the differential amplifier, and converts the analog signals to a digital signal of "0" or "1" according to a positive or negative value of the analog signal after differential amplification in the analog signal conversion element, thus the analog signal from a phototransistor being converted to a digital signal without using any fixed threshold value.

Also in the image identifying apparatus using the image sensor according to the present invention therein, a plurality of image sensors are provided each in correspondence to a characteristic portion of a document image, images of characteristic portions of the document image are simultaneously inputted from the plurality of image sensors, and image identification is executed accurately at a high speed by comparing the digital signals (false image data) inputted from the plurality of image sensors for making discrimination as to whether the document is a particular image or not.

Other objects and features of this invention will become understood from the following description with reference to the accompanying drawings.

DESCRIPTION OF THE PREFERRED EMBODIMENTS

Detailed description is made hereinafter for Embodiment 1 and Embodiment 2 of the present invention with reference to a case where an image sensor according to the present invention and an image identifying apparatus using the image sensor above therein are applied and to the related drawings.

Figure 1A:
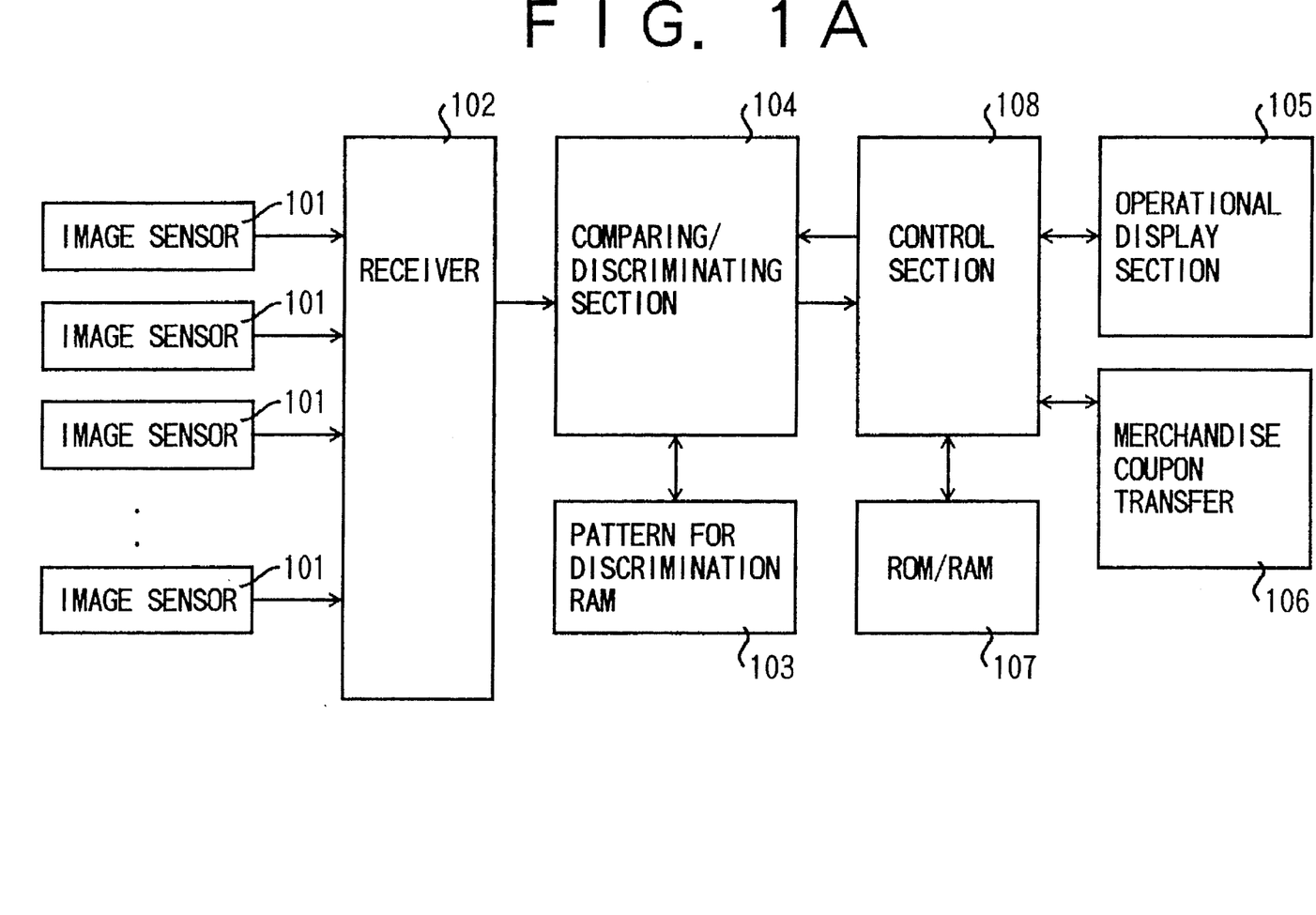
FIG. 1A is a block diagram illustrating a merchandise coupon classifying apparatus in which an image sensor according to Embodiment 1 of the present invention and an image identifying apparatus using the image sensor therein are applied.
Figure 1B:
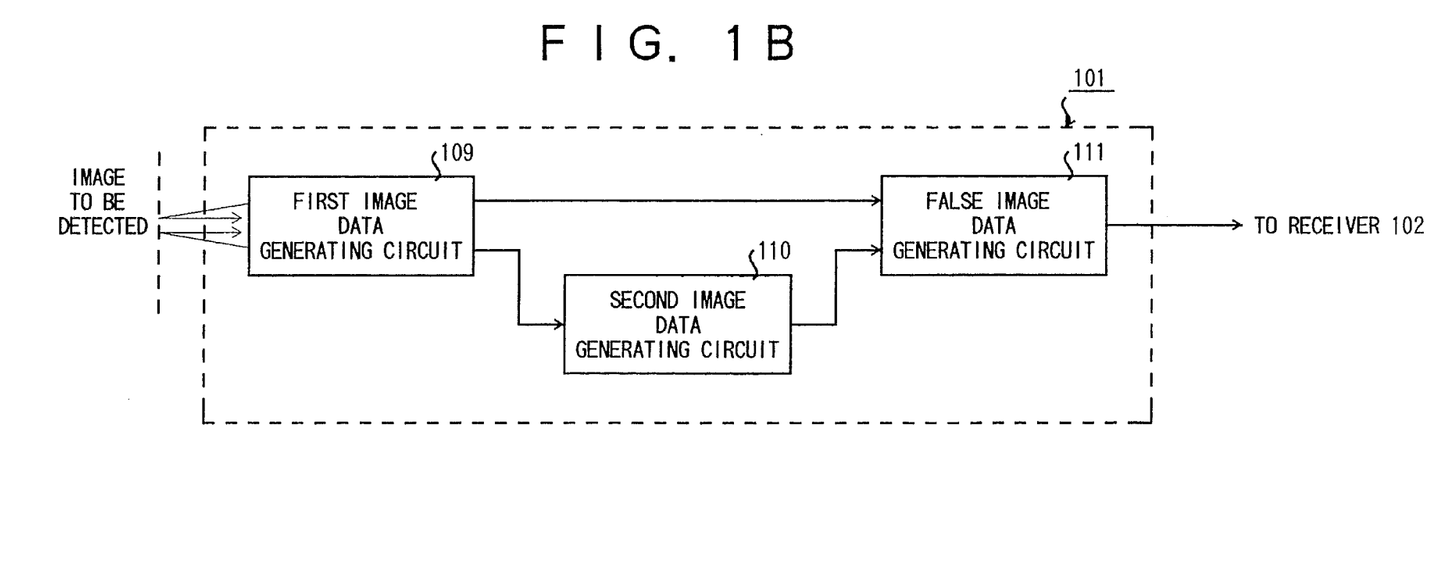
FIG. 1B is a block diagram illustrating a configuration of the image sensor shown in FIG. 1A.

FIG. 1A and FIG. 1B are block diagrams each illustrating a merchandise coupon classifying apparatus according to Embodiment 1 of the present invention respectively, comprising a plurality of image sensors 101 (each according to the present invention) in which an image to be detected on a merchandise coupon is inputted and false image data described hereinafter is generated, a receiver 102 which fetches the false image data generated by the plurality of image sensors 101 into a comparing/discriminating section 104 in the next stage, a pattern for discrimination RAM 103 in which a 2-valued digital signal for discriminating a merchandise coupon (a particular image) has been stored as a pattern for discrimination, a comparing/discriminating section 104 which makes discrimination as to whether the image to be detected is an image of the merchandise coupon or not by comparing the pattern for discrimination to the false image data previously inputted from the image sensors 101, an operational display section 105 for execution of various types of operation and displays, a merchandise coupon transfer section 106 which feeds merchandise coupons one by one from a merchandise coupon tray (not shown) and transfers the merchandise coupons according to a result of classification to a discharge tray (not shown), a ROM/RAM 107 which is used as a work memory for storing various types of control program, numerical values for control, and for works, and a control section 108 for controlling the entire apparatus.

The image sensor 101 according to the present invention is largely formed with, as shown in FIG. 1B, a first image data generating circuit 109 in which light is irradiated onto an image to be detected, the reflected light is received, photoelectric conversion is executed, and first image data is generated therein; a second image data generating circuit 110 in which the first image data is inputted and delayed therein by a specified period of time and second image data is generated therein; and a false image data generating circuit 111 in which the first image data is compared to the second image data and false image data comprising a 2-valued digital data of "0" or "1" is generated based on whether a value for the first image data is larger than that for the second image data or not.

Detailed description is made hereinafter for circuit configuration of the image sensor 101 with reference to FIG. 2. The first image data generating circuit 109 comprises a light emitting diode 201 to irradiate light onto a image to be detected, 2 pieces of phototransistor 202 as a photoelectric conversion element which receives reflected light from light irradiated onto the image to be detected from the light emitting diode 201, an amplifier 203 which amplifies an electric signal (analog signal) subjected to photoelectric conversion by the phototransistor 202, and a variable resistor VR1 to adjust a gain in the amplifier 203. It should be noted that the reference numeral 204 indicates a capacitor, R1, R2 and R3 a resistor respectively.

Also the second image data generating circuit 110 is a time constant circuit comprising a capacitor 205, diodes 206 to 208, and resistors R4, R5, in which an analog signal outputted from the amplifier 203 in the first image data generating circuit 109 is supplied as input and an analog signal delayed by the CR time constant decided according to a relation between the capacitor 205 and the resistor R4 is outputted as second image data.

Furthermore, a false image data generating circuit 111 comprises a differential amplifier consisting of resistors R6, R7 and an amplifier 209, and a not gate 210. Herein, the first image data ① is inputted to a negative input terminal of the amplifier 209, while the second image data ② is inputted to a positive input terminal thereof. Also in the not gate 210, an analog signal outputted through differential amplification of the first image data ① and the second image data 2. is supplied as input and the analog signal is converted to a 2-valued digital signal of "0" or "1" depending on a value whether a value of the first image data ① coincides with that of the second image data ② (namely a voltage value of "0") as a threshold value. It should be noted that a 2-valued digital signal outputted from this not gate 210 is used as the false image data.

Figure 3A:
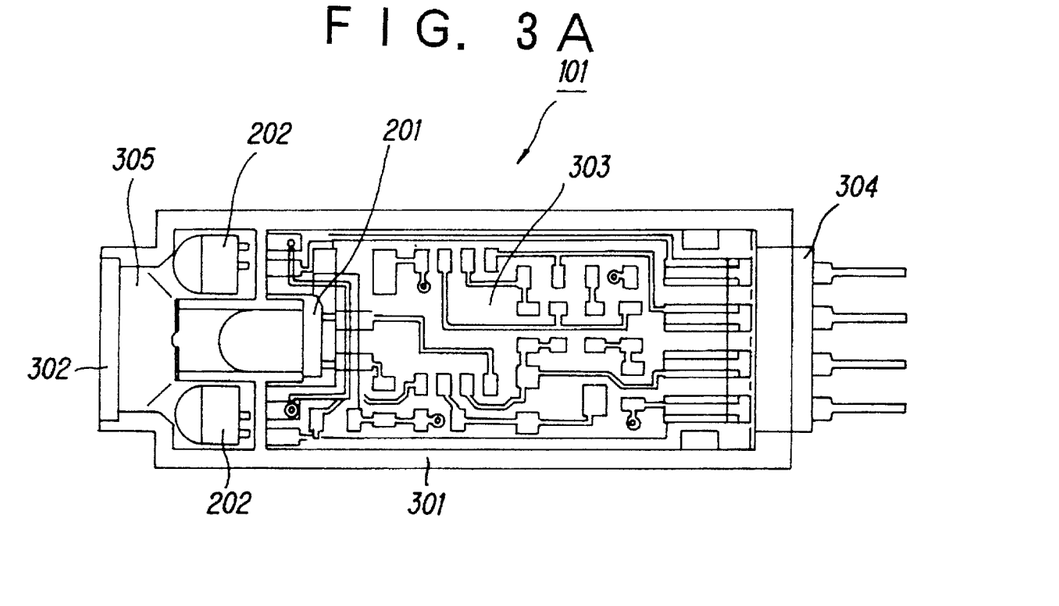
FIG. 3A is a view illustrating concrete construction of an image sensor.

FIG. 3A shows construction of the image sensor 101, in which each circuit is formed on a control substrate 303 provided in a frame consisting of a case 301 and glass 302. It should be noted that the reference numeral 304 indicates an output connector which outputs a signal from the image sensor 101 to the receiver 102, and 305 indicates a light shielding plate.

Figure 3B:
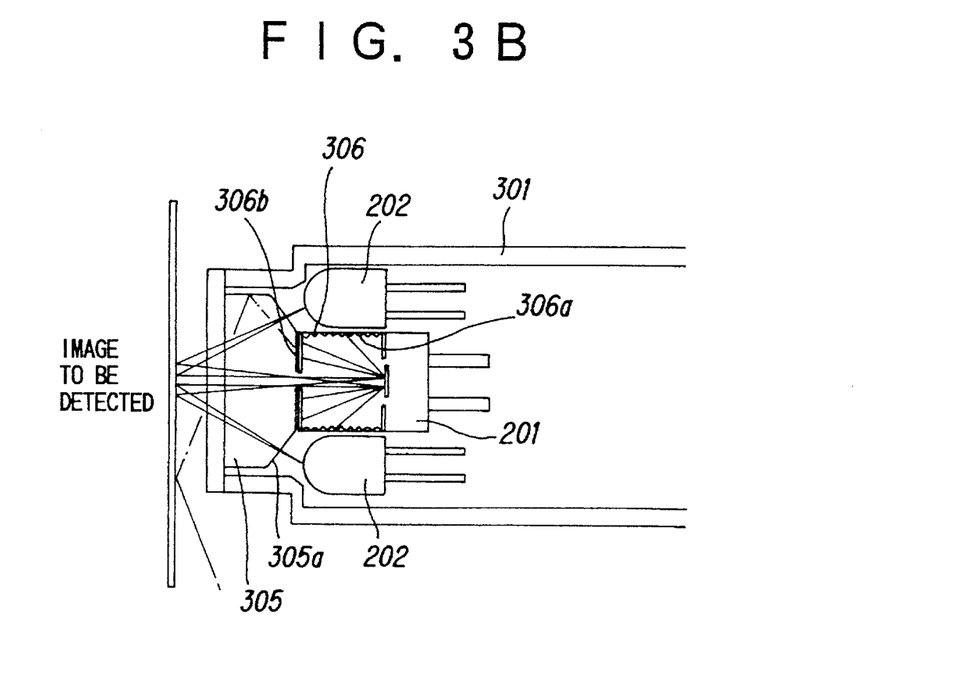
FIG. 3B is a view illustrating optical characteristics of an image sensor.

FIG. 3B shows optical features of the image sensor 101, and in this embodiment a triangular waveform section 306a is provided inside a cap 306 enclosing the light emitting diode 201 so that light irradiated onto an image to be detected is limited as much as possible to the light directly outputted from the light emitting diode 201, and also a slit film 306b to focus a point to be detected is provided on the tip section of the cap 306. By making a size of a slit in this slit film 306b variable, it is possible to change a detection area (or detection range) of an image to be detected by the image sensor 101. On the light shielding plate 305 is formed a flat surface section 305a onto which the reflected light from an image to be detected is irradiated vertically with an angular section of the phototransistor 202 cut to shut off light coming into from outside and lead only the reflected light of light outputted from the light emitting diode 201 to the phototransistor 202. With the configuration described above, it is possible to efficiently guide reflected light from an image to be detected to the phototransistor 202 without using such a device as lens and also to reduce a size of the image sensor 101.

Performance and outer dimensions of the image sensor 101 according to the present invention having the configuration as described above are shown together with those of reflection type of sensors (examples 1 to 4 for comparison) obtainable in the market in Table 1. As clearly shown in Table 1, the image sensor 101 according to the present invention enables reduction of a size of image sensor to ⅕ or below as compared to that of reflection type of image sensors obtainable in the market, and the performance for detecting a image to be detected is high irrespective of its small size and the light weight. Especially, the circuit configuration is very simple, so that the response speed is very high. In addition, it is possible to substantially reduce the cost, which in turn contributes to reduce cost of an image identifying apparatus as a whole.

Also as a plurality of image sensors 101 according to the present invention can be purchased with the cost to purchase a reflection type of sensor based on the conventional technology, it is possible to easily form an image identifying apparatus using a plurality of image sensors therein for improving the cost-performance ratio.

TABLE 1

|  | IMAGE SENSOR ACCORDING TO PRESENT INVENTION | EXAMPLE 1 | EXAMPLE 2 | EXAMPLE 3 | EXAMPLE 4 |
| --- | --- | --- | --- | --- | --- |
| DETECTION DISTANCE | 0–3 mm | 10–12 mm | 10 ± 2 mm | 3–10 m | 12 ± 2 mm |
| MINIMUM DETECTION WIDTH | 0.15 mm | 0.1 mm | 2 × 3 mm | 0.1 mm | 0.5 mm |
| RESPONSE TIME | BELOW 10 μs | 10 μs | BELOW 1 ms | 20 μs | BELOW 1 ms |
| LIGHT SOURCE | LIGHT EMITTING DIODE | TUNGSTEN-FILAMENT LAMP | LIGHT EMITTING DIODE | INCANDESCENT LAMP | LIGHT EMITTING DIODE |
| LENS EXISTENCE | x | o | o | o | o |
| APPEARANCE DIMENSION (mm) | 15 × 48, t = 5 | 51 × 100, t = 30 | 20 × 75, t = 23 | 60 × 76, t = 30 | 22 × 65, t = 20 |

Assuming the configuration as described above, now description is made for (1) operational principles of the image sensor, and (2) concrete operations of the image sensor in this order.

(1) Operational principles of the image sensor

In Embodiment 1, light is irradiated from the light emitting diode 201 onto an image to be detected, the reflected light is received by the phototransistor 202 to execute photoelectric conversion, an analog signal from the phototransistor 202 is amplified by the amplifier 203, the analog signal amplified in the second image data generating circuit (time constant circuit) 110 is delayed by a specified period of time, then the analog signal outputted from the amplifier 203 and the delayed analog signal are differentially amplified by the amplifier 209, the analog signals are converted to a digital signal of "0" or "1" according to a positive or negative value of the analog signal differentially amplified as described above in the knot gate 210 in the knot gate 210, and the analog signal from the phototransistor 202 is converted to false image data (2-valued digital signal) without using a fixed threshold.

Figure 2:
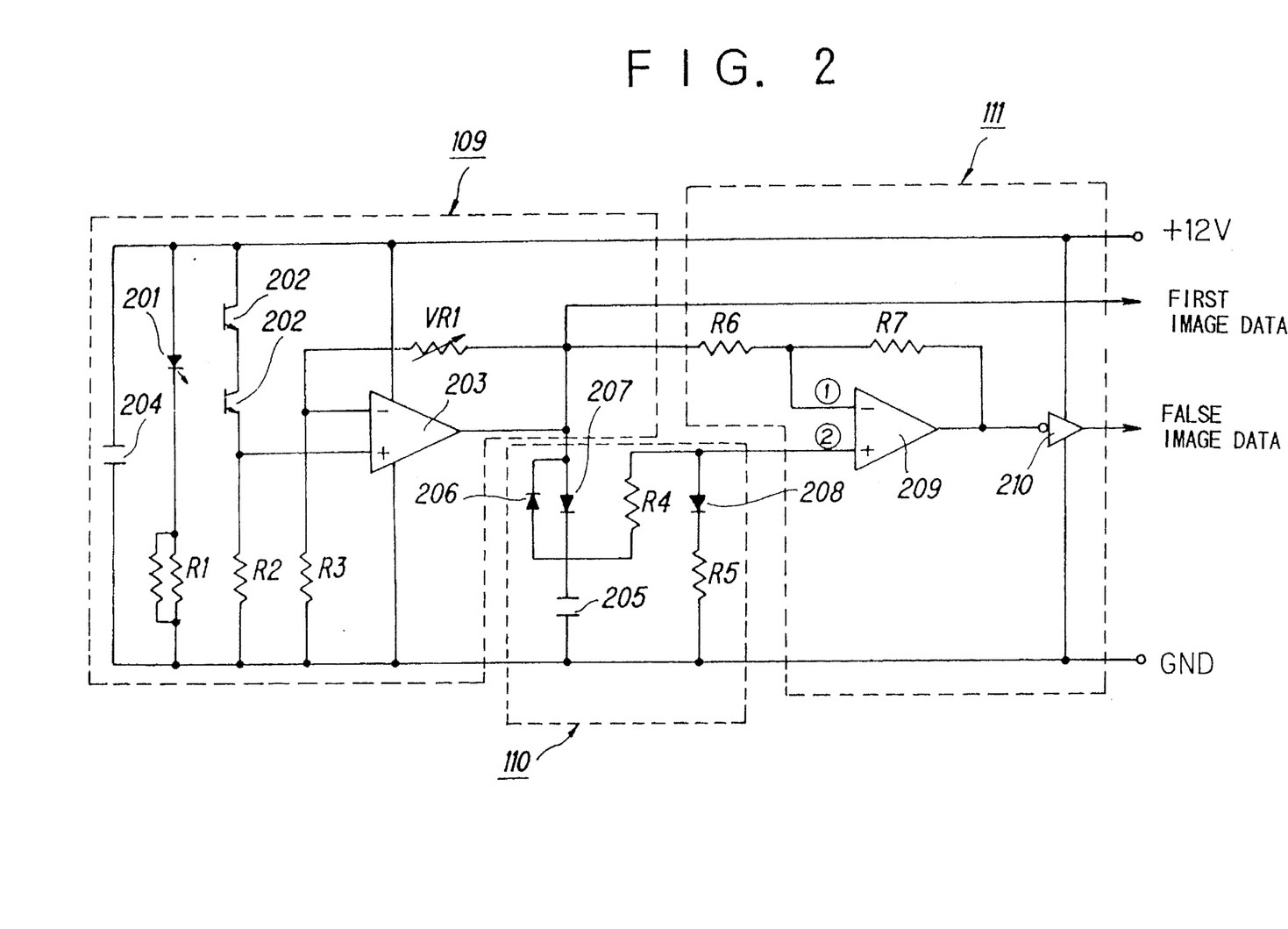
FIG. 2 is a view illustrating circuit configuration of the image sensor according to Embodiment 1.

Concretely, in the image sensor 101, at first light is irradiated from the light emitting diode 201 onto an image to be detected, the reflected light is received by and converted to an electric signal in the phototransistor 202, the electric signal is amplified by the amplifier 203 to obtain the first image data ① (Refer to FIG. 2).

Then, the first image data ① is delayed by the CR time constant in the second image data generating circuit 110 to obtain the second image data ② (Refer to FIG. 2).

Waveforms of analog signals for the first image data ① and the second image data ② thus obtained are identical including the point that the latter is delayed by the CR time constant from the former. For instance, as shown in FIG. 4, a waveform of analog signal for the first image data shown 1. by a solid line in the figure is followed by that for the second image data ② shown by a broken line.

Figure 4:
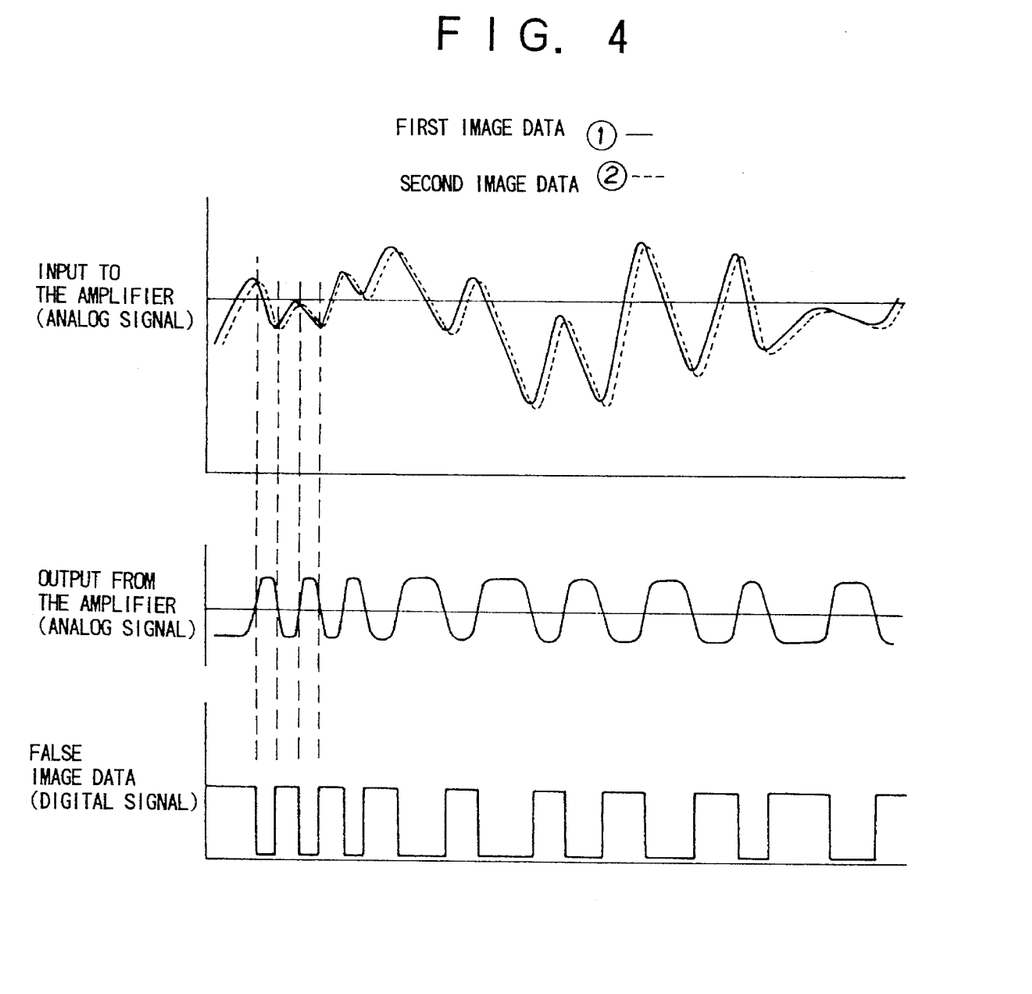
FIG. 4 is a view illustrating operational principles of the image sensor according to Embodiment 1.

When the first image data ① and the second image data ② each having the waveform as shown in the figure are inputted to a negative input terminal and a positive input terminal of the amplifier 209, output from the amplifier 209 becomes a negative value when a value for the first image data ① is larger than that for the second image data ②, and becomes a positive value when a value for the first image data ① is smaller than that for the second image data ②, as shown in FIG. 4.

This output from the amplifier 209 is converted to a 2-valued digital signal of "0" or "1" by the knot gate 210 using a value at which the first image data ① coincides with the second image data ② as a threshold value, thus false image data being obtained as shown in FIG. 4.

The first image data ① and the second image data ②, both of which are original image data before generation of the false image data, are image data (herein analog signals) specific to an image to be detected. On the other hand, the false image data is generated by differentially amplifying and inverting this original data to digitize it, so that the false image data (digital signal) is naturally specific to the image to be detected. For this reason, when the two types of false image each data generated as described above are identical, it means that the first image data is identical; namely it can be determined that the image to be detected is the same as the original image.

So false image data is generated by previously reading an original image (an image of a merchandise coupon in this embodiment) to be discriminated with the image sensor 101 at first, this false image data is stored as a pattern for discrimination in the RAM 103, then false image data is generated by reading an image to be detected with the image sensor 101, and it is determined that the image to be detected is the same as the original data, when this false data coincides with the pattern for discrimination.

However, due to such reasons as damage or dirtiness of an image of a merchandise coupon which is an image to be detected, it is rare that the false image data completely coincides with the pattern for discrimination, so generally a similarity degree between the false image data and the pattern for discrimination is computed, and it is determined that the image to be detected is the same as the original image, when the similarity degree is equal to or higher than a specified value.

As clearly understood from the above description, the image sensor 101 does not convert an analog signal to a digital signal by using a fixed threshold value and generates false image data by converting an analog signal to a digital signal depending on whether a value for the first image data ① is larger than that for the second image data ② or not, so that it is not necessary to carry out a gain adjustment for the amplifier 203 at a high precision. In other words, amplification only to a range where signal processing can be executed in a circuit in the downstream from the amplifier 203 is required, so that gain adjustment may be carried out roughly.

Furthermore, in the conventional type of image sensor, density data (image data) is generated by using a fixed threshold value, influence by unevenness in density of an image to be detected is quite large, but in the image sensor 101 according to the present invention, false image data is generated by converting an analog signal to a digital signal depending on whether a value for the first image data ① is larger than that for the second image data ② or not, so the operation is hardly affected by unevenness in density of an image to be detected, and image identification can be carried out in a wider range as compared to that with the conventional type of image sensor.

Also, as the operation for image identification is hardly affected by unevenness in density of an image to be detected, when false image data is generated by inputting an image having the same contents as a pattern for discrimination, if the false image data does not coincide with the pattern for discrimination, it can easily be recognized that dirtiness (dirtiness of the image) exists in a portion where the false image data does not coincide with the pattern for discrimination. For this reason, it is clear that the image sensor 101 according to the present invention is applicable to an apparatus for detecting dirtiness.

(2) Concrete operation

Next description is made for concrete operations of the image identifying apparatus according to Embodiment 1 of the present invention. At first, a pattern for discrimination is registered in the discrimination pattern RAM 103 before identification of a merchandise coupon is carried out. This registration of a pattern for discrimination is carried out by operating a mode key (not shown) in the operation displaying section 105 for specifying a discrimination pattern registration mode, causing the image sensor 101 to read a document to be identified (herein a merchandise coupon) for generating false image data, and causing the discrimination pattern RAM 103 to store this false image data as a pattern for discrimination. It should be noted that the processing above for registration of a pattern for discrimination can be omitted by mounting a RAM with a pattern for discrimination stored therein by using a dedicated device previously as the discrimination pattern RAM 103.

Figure 5A:
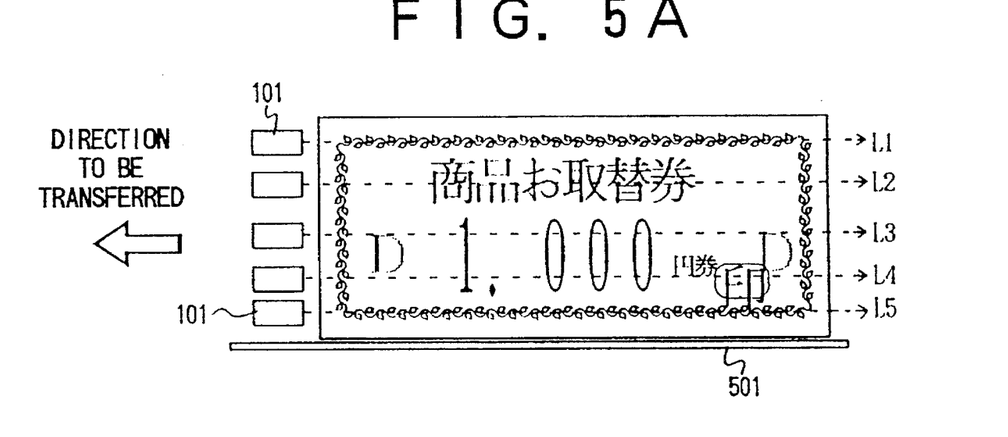
FIG. 5A is a view illustrating an example of registration of a pattern for discrimination.
Figure 5B:
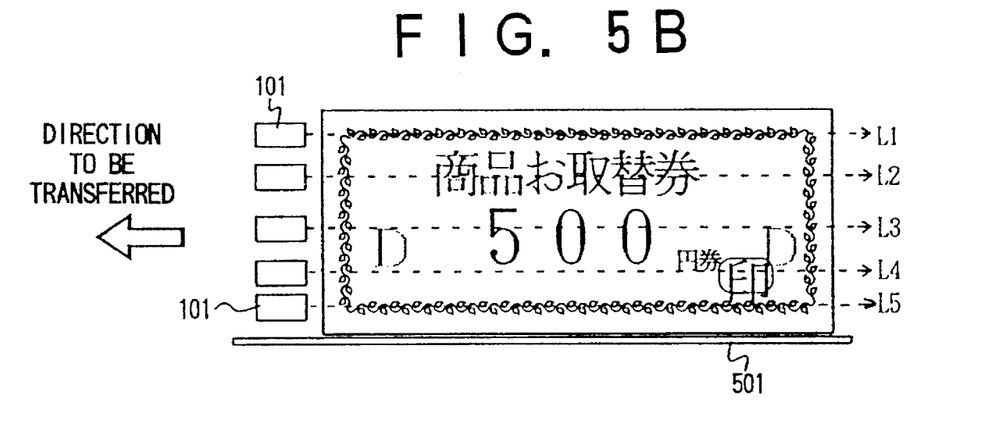
FIG. 5B is a view illustrating an example of registration of a pattern for discrimination.
Figure 5C:
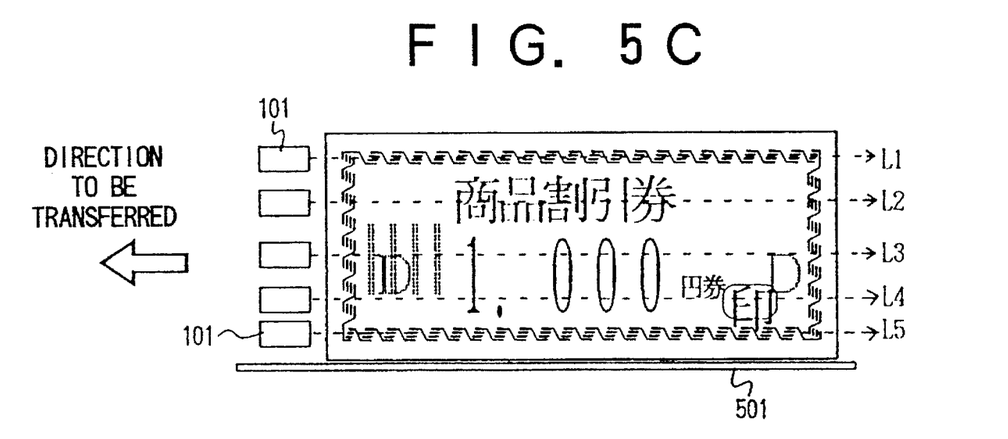
FIG. 5C is a view illustrating an example of registration of a pattern for discrimination.

FIG. 5A to FIG. 5C show examples of registration of a pattern for discrimination. After specifying a discrimination pattern registration mode, merchandise coupons each having the original image to be detected is set on a specified tray (not shown) and a start key (not shown) is depressed, when the merchandise coupons are fed one by one by the merchandise coupon transfer section 106, and transferred to an image input position where a plurality of image sensors 101 are provided. In this step, each of the merchandise coupons is pressed against a side guide 501 for screw correction during transfer so that an image to be detected on the merchandise coupon to be read by each image sensor 101 is placed at a specified correct position. Description herein assumes a case where 5 units of the image sensor 101 are provided to simplify the explanation, but it should be noted that a number and arrangement of the image sensors 101 are not limited to those in this case. Also the 5 units of image sensor 101 are provided at positions each corresponding to a characteristic portion of an image of each merchandise coupon (positions on lines L1 to L5 in this figure) respectively, and the characteristic portions of the image of the merchandise coupon are inputted simultaneously by the image sensors 101 respectively.

An image of a merchandise coupon transferred thereto is read by each of the image sensors 101, and the false image data is generated. The false image data is stored together with the line positions of the image sensor 101 which reads the false image data (lines L1 to L5 in the figure) on which the image sensors are provided in the discrimination pattern RAM 103.

The above processing is executed by the number of types of merchandise coupon, and the patterns for discrimination are registered respectively. For instance, false image data corresponding to line positions L1 to L5 of an image of the coupon exchangeable with merchandise worth ¥1,000 as shown in FIG. 5A are generated and registered as patterns for discrimination. Similarly 5 pieces of false image data corresponding to lines L1 to L5 of an image of the coupon exchangeable with merchandise worth ¥500 as shown in FIG. 5B is generated and registered as patterns for discrimination. Furthermore 5 pieces of false data corresponding to line positions L1 to L5 of an image of the coupon exchangeable with merchandise worth ¥1,000 as shown in FIG. 5C are generated and registered as patterns for discrimination.

As described above, by storing false image data generated by a plurality of image sensors 101 provided at different line positions respectively as patterns for discrimination, it is possible to discriminate each merchandise coupon accurately in a merchandise coupon discriminating process described hereinafter. For instance, in cases of the coupon exchangeable with merchandise worth ¥1,000 shown in FIG. 5A and that exchangeable with merchandise worth ¥500 shown in FIG. 5B, although the images at lines L1, L2, and L5 are identical (namely the false image data is identical), those at lines L3 and L4 are different, so that the coupons can be identified as merchandise coupons at the lines L1, L2 and L5, and whether the merchandise coupons is a ¥1,000 coupon or a ¥500 coupon can accurately be discriminated at the lines L3 and L4. Also in cases of the ¥1,000 merchandise coupon shown in FIG. 5A and the ¥1,000 merchandise coupon shown in FIG. 5C, the images at the line L4 are identical, but those at the lines L1, L2, L3 and L5 are different, so that they are easily discriminated.

Figure 6:
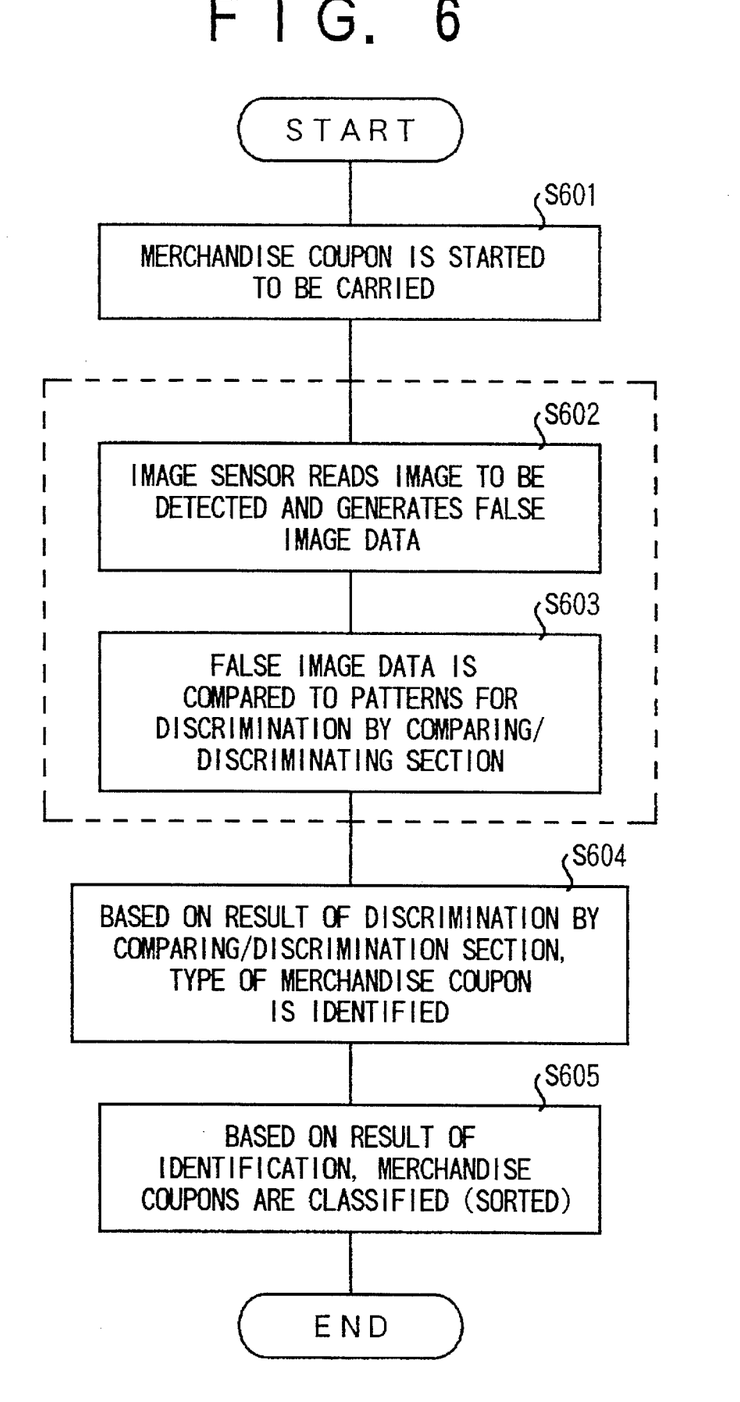
FIG. 6 is a flow chart of a processing for discriminating merchandise coupons.
Figure 7:
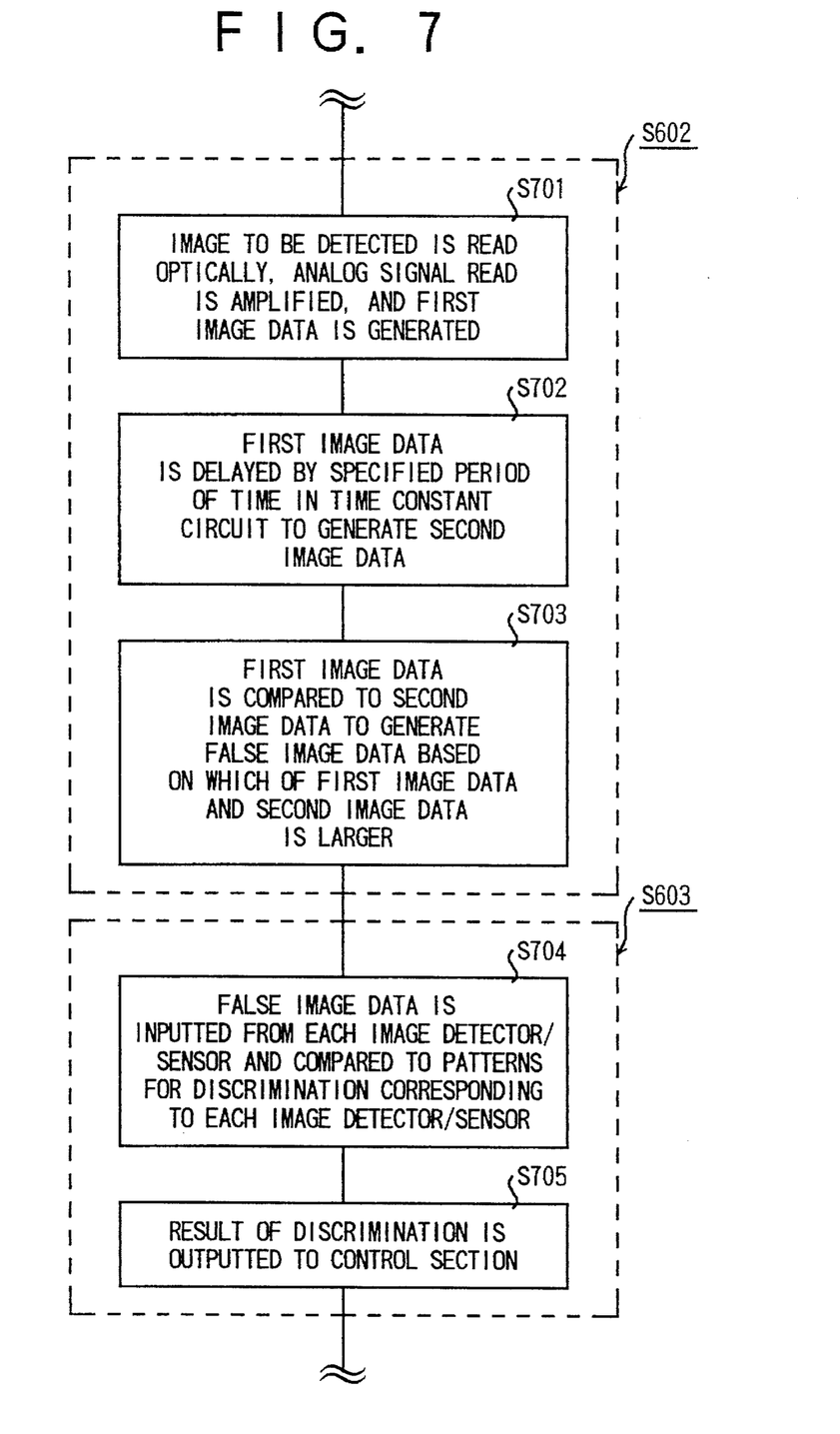
FIG. 7 is a flow chart more concretely illustrating S602 and S603 in FIG. 6.

Next description is made for the processing for discriminating merchandise coupons with reference to FIG. 6 and FIG. 7.

When a merchandise coupons to be discriminate are placed on a tray of the merchandise coupon transfer section 106 and a start key in the operation displaying section 105 is depressed, the control section 108 executes a processing for discriminating merchandise coupons as shown by the flow chart in FIG. 6. At first, the control section 108 feeds one sheet of merchandise coupon from the tray, controlling the merchandise coupon transfer section 106, and transfers the merchandise coupon to the image input position where a plurality of image sensors 101 are provided (S601).

Then, the plurality of image sensors 101 read images of the merchandise coupon transferred to the image input position to be discriminated to generate false image data respectively (S602), and each of the false image data are compared to patterns for discrimination respectively in the comparing/discriminating section 104 (S603).

Then, depending on the result of discrimination in the comparing/discriminating section 104, a type of the merchandise coupon is identified from a combination of the false image data each identical to a pattern for discrimination at the corresponding line positions from L1 to L5 (Refer to FIG. 5) (S604), and depending on the result of this discrimination, the control section 108 assorts the merchandise coupon to a corresponding discharge tray, controlling the merchandise coupon transfer section 106 (S605).

FIG. 7 shows a flow chart more concretely illustrating the steps S602 and S603 in FIG. 6. The image sensor 101 optically reads an image to be detected by irradiating light onto a merchandise coupon from the light emitting diode 201 and converting the reflected light to an analog signal in the phototransistor 202 and generates first image data by amplifying the analog signal read as described above in the amplifier 203 (S701).

Then, the first image data is delayed by a specified period of time in the second image data generating circuit 110 (time constant circuit), thus the second image data being generated (S702).

Then, false image data is generated by differentially amplifying the first and second image data using the amplifier 209 and the knot gate 210 in the false image data generating circuit 111 and inverting the analog signals to 2-valued digital signals. In other words, the false image data is generated based on whether a value for the first image data is larger than that for the second image data or not (S703).

The comparing/discriminating section 104 receives the false image data supplied via the receiver 102 as input from each image sensor 101, reads patterns for discrimination each corresponding to positions (L1 to L5) of each image sensor 101 respectively, compares the false image data to the corresponding pattern for discrimination, and computes the degree of similarity (S704). As the general pattern matching method is applicable for computing the similarity degree, the detailed description is omitted here.

Then the similarity degree computed as described above is compared to a reference value (a similarity degree as a threshold value), and if the computed similarity degree is equal to or larger than the reference value, it is determined that the false image data is the same as the pattern for discrimination, and the result of discrimination is outputted to the control section 108 (S705).

As described above, whether an image to be detected coincides with the original image to be identified or not can be determined by comparing false image data to patterns for discrimination. Furthermore, by discriminating types of merchandise coupons depending on the results of discrimination, types of merchandise coupon can accurately be discriminated.

As described above, in Embodiment 1, whether an image to be detected is identical to the original image to be identified or not is determined by generating false image data with the image sensors 101 and comparing the false image data to patterns for discrimination, so that gain adjustment can easily be carried out, and also it is possible to eliminate needs for maintenance for gain adjustment without introducing any specific gain adjustment mechanism. Also it is possible to build an image detector/sensor without using any CCD element, a cheap apparatus can be provided, and furthermore as an original image can be identified from false image data, it is possible to carry out image discrimination with a cheap apparatus at a certain degree of accuracy.

Also the image sensor 101 according to Embodiment 1 of the present invention is built with a combination of the light emitting diode 201 and phototransistor 202 and without using any lens, the circuit configuration is simple and a size of the sensor can be reduced. Also as the circuit is simple, the response speed is extremely high.

Furthermore, In Embodiment 1, as a merchandise coupon is recognized by a plurality of image sensors 101 provided at a plurality of line positions (L1 to L5) respectively, it is possible to discriminate a number of images by registering patterns for discrimination.

Embodiment 2 of the present invention enables low cost and high speed image discrimination when it is necessary to execute image discrimination in a case where types of document image are limited to a certain number. As the basic configuration and operation in Embodiment 2 are the same as those in Embodiment 1, only the different portions are described herein.

Figure 8A:
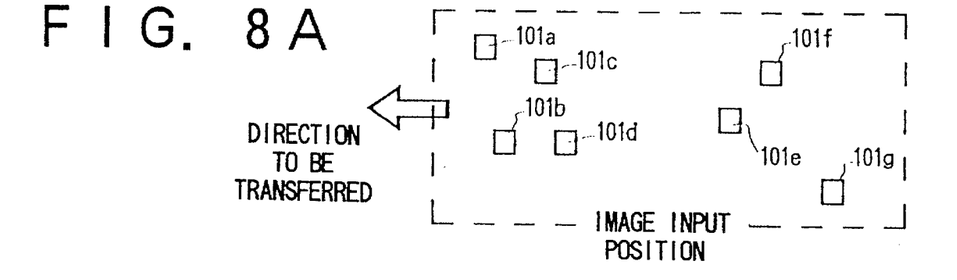
FIG. 8A shows arrangement of image sensors.

FIG. 8A shows arrangement of the image sensors 101 (101a to 101g) in Embodiment 2. In Embodiment 1, as shown in FIG. 5, the image sensors 101 are provided in a series, and each of the image sensors 101 reads images in the direction of lines L1 to L5 respectively in association with transfer of a merchandise coupon, but in Embodiment 2, types of merchandise coupon (document image) are limited to a certain number and a timing for inputting an image of the merchandise coupon is fixed to a point of time when the merchandise coupon exists at the image input position, and the image sensors 101a to 101g are provided at positions corresponding to characteristic portions of the image which are essential for discrimination of the image.

Figure 8B:
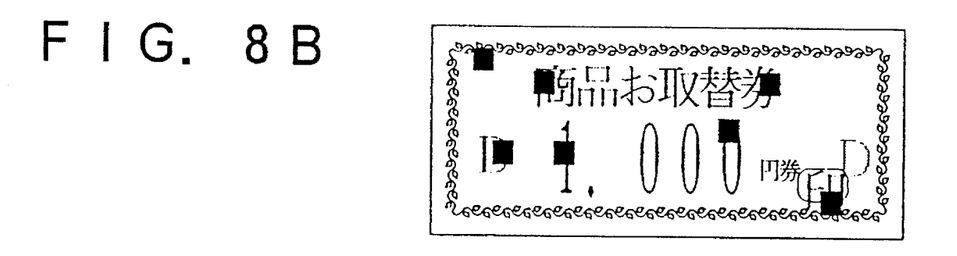
FIGS. 8B to 8D show characteristic portions of a merchandise coupon corresponding to positions of image sensors shown in FIG. 8A.
Figure 8C:
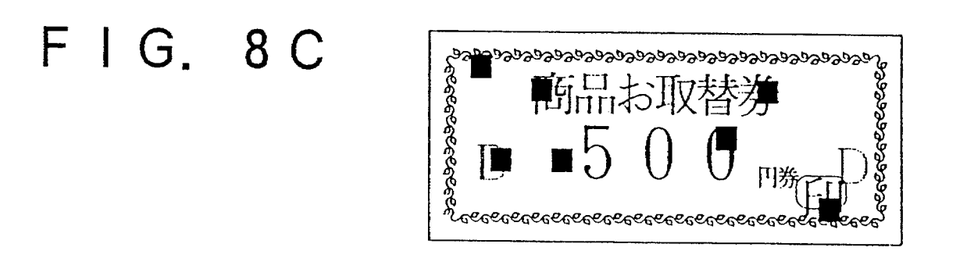
Figure 8D:
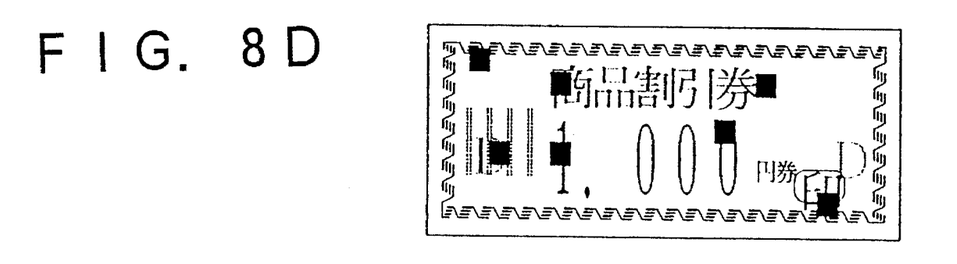

Also FIG. 8B to FIG. 8D show characteristic portions of an image of a merchandise coupon corresponding to the image sensors 101a to 101g respectively.

With the configuration as described above, in Embodiment 2, when a merchandise coupon to be discriminated is transferred to and reaches the image input position shown in FIG. 8A, the image sensors 101a to 101g simultaneously reads images to be detected corresponding to the positions respectively to generate false image data, and the false image data generated by each sensor is simultaneously transferred to the comparing/discriminating section 104. It should be noted that, in this process, the image sensors 101a to 101g reads and inputs images to be detected for a prespecified period of time. In other words, the image sensors 101a to 101g generate false image data for an area of an image to be detected corresponding to a movement decided by the merchandise coupon transfer speed and the prespecified period of time described above.

The false image data as described above is supplied as input to the comparing/discriminating section 104, where determination as to whether the false image data coincides with patterns for discrimination or not is executed, and merchandise coupons are discriminated and assorted according to patterns regarded as identical in the control section 108 and a combination thereof. It is needless to say that the patterns for discrimination used in this step are those previously registered by the apparatus according to Embodiment 2.

As described above, in Embodiment 2, as the low cost and compact image sensor 101 is used, it is possible to use a number of sensors, and also as a degree of freedom in designing the sensor arrangement becomes high, when types of document images are limited to a certain number, it is possible to build an image identifying apparatus which enables low cost and high speed image identification.

Figure 9:
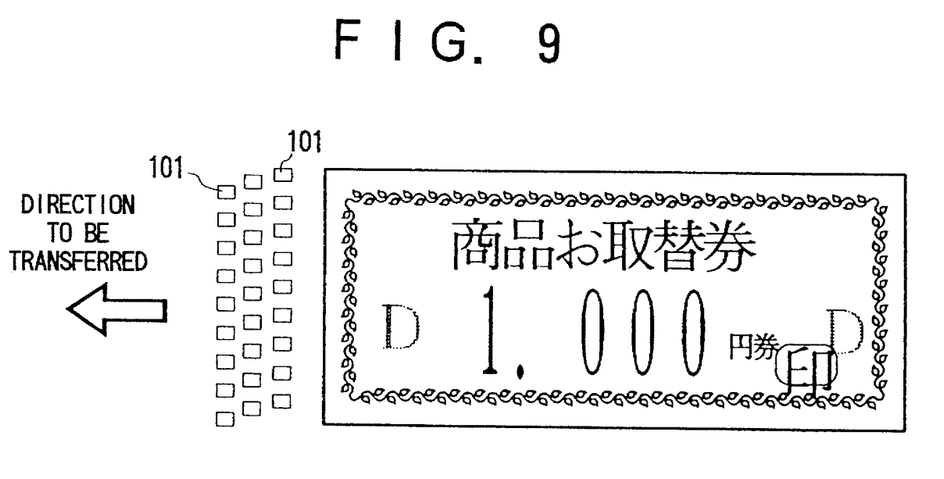
FIG. 9 is a view illustrating an image identifying apparatus using the image sensor according to the present invention which can discriminate complicated patterns or pictures.

As anther embodiment of the present invention, as shown in FIG. 9, by providing a number of image sensors 101 according to the present invention in high density in the direction in which merchandise coupons are transferred and also in the direction vertical to the former direction, it is possible to build an image identifying apparatus which enables discrimination of complicated images and patterns. In this case, however, the price of apparatus becomes expensive in proportion to a number of the image sensors 101, but in a case where patterns or marks for discrimination exist only at specific positions, a necessary number of image sensors may be provided only at the necessary positions, so it is economically more advantageous as compared to a case where CCD elements are used.

As described above, the image sensor according to the present invention comprises a light emitting diode which irradiate light onto a document image, a phototransistor which receives reflected light from the document image and executes photoelectric conversion, an operational amplifier to amplify an analog signal from the foregoing phototransistor, a time constant circuit into which the analog signal outputted from the operational amplifier is inputted and which delays the analog signal by a specified period of time, a differentially amplifying circuit input which the analog signal outputted from the operational amplifier and the analog signal delayed by a specified period of time in the time constant circuit are inputted and which differentially amplified the analog signals, and an analog signal conversion element into which the analog signal outputted from the differential amplifier are inputted and which outputs a digital signal of "0" or "1" according to the analog signal is positive or negative, so that image identification can be carried out with lost cost at a certain degree of accuracy, and also it is possible to easily carry out gain adjustment as well as to reduce a size of image sensor.

Also the image identifying apparatus according to the present invention which makes determination as to whether a document image is a specific one or not by comparing image data generated by means of optically reading the image document to patterns for discrimination prepared previously comprises a plurality of image sensors each irradiating light onto the document image, receiving the reflected light, differentially amplifying the analog signal subjected to photoelectric conversion and the analog signal generated by delaying the former analog signal by a specified period of time, and outputting as false image data a digital signal of "0" or "1" according to whether the analog signal differentially amplified as described above is positive or negative; a storage means in which 2-valued signals are stored as patterns for discriminating a particular image previously; and a discriminating means for discriminating whether the document image is the particular image or not by comparing the false image data supplied as input from the plurality of image sensors to the patterns for discrimination stored in the storage means described above, said plurality of image sensors provided at positions corresponding to characteristic portions of the document image respectively, and said plurality of image sensors simultaneously reading the characteristics portions of the document image, so that, when types of document image are limited to a certain number, it is possible to execute low cost and highs peed image discrimination.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image sensor comprising:

a light emitting diode which irradiates light onto a document image;

a phototransistor which receives reflected light from said document image and executes photoelectric conversion;

an operational amplifier to amplify an analog signal from said phototransistor;

a time constant circuit into which said analog signal outputted from said operational amplifier is inputted and which delays said analog signal by a specified period of time;

a differential amplifier into which said analog signal outputted from said operational amplifier and said analog signal delayed by a specified period of time in said time constant circuit are inputted and which differentially amplifies said analog signals; and an analog signal conversion element into which said analog signal outputted from said differential amplifier are inputted and which outputs a digital signal of "0" or "1" according to said analog signal is positive or negative.

2. An image sensor according to claim 1, wherein said analog signal conversion element is a not gate.

3. An image sensor according to claim 1, wherein a triangular waveform section is provided inside a cap enclosing said light emitting diode.

4. An image sensor according to claim 3, wherein a slit film to focus a point to be detected is provided on the tip section of said cap.

5. An image sensor according to claim 1, further comprising:

a light shielding plate for shielding light coming into from outside and leading only the reflected light of light outputted from said light emitting diode to said phototransistor.

6. An image sensor according to claim 5, wherein said light shielding plate is formed a flat surface section onto which the reflected is irradiated vertically with an angular section of said phototransistor.

7. An image identifying apparatus which makes determination as to whether a document image is a specific one or not by comparing optically generated image data of said document image to predetermined patterns for discrimination, said apparatus comprising:

a plurality of image sensor means, each said sensor means irradiating light onto said document image, receiving light reflected from said document image, differentially amplifying a first image data analog signal subjected to photoelectric conversion and a second image data analog signal generated by delaying said first image data analog signal by a specified period of time, and outputting as false image data a digital signal of "0" or "1" according to whether said first image data analog signal differentially amplified is positive or negative;

a memory in which digital signals are stored as predetermined patterns to be used for discriminating a particular image; and a discriminating means for discriminating whether said document image is the particular image or not by comparing said false image data supplied as input from the plurality of image sensors to the patterns for discrimination stored in said memory.

8. An image identifying apparatus according to claim 7, wherein said plurality of image sensor means are provided at positions corresponding to characteristic portions of said document image respectively and simultaneously read the characteristics portions of said document image.

* * * * *